US008626477B2

(12) United States Patent
Oh

(10) Patent No.: US 8,626,477 B2
(45) Date of Patent: Jan. 7, 2014

(54) SPREADSHEET-BASED GRAPHICAL USER INTERFACE FOR MODELING OF PRODUCTS USING THE SYSTEMS ENGINEERING PROCESS

(75) Inventor: Kong Ping Oh, Troy, MI (US)

(73) Assignee: XLDYN, LLC, Brighton, MI (US)

( * ) Notice: Subject to any disclaimer, the term of this patent is extended or adjusted under 35 U.S.C. 154(b) by 100 days.

(21) Appl. No.: 13/040,417

(22) Filed: Mar. 4, 2011

(65) Prior Publication Data

US 2012/0226967 A1 Sep. 6, 2012

(51) Int. Cl.
*G06G 7/48* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl.
USPC .............................. 703/6; 715/212

(58) Field of Classification Search
USPC .............................. 703/6; 715/212
See application file for complete search history.

(56) References Cited

U.S. PATENT DOCUMENTS

| 6,535,861 | B1 | 3/2003 | O'Connor et al. |
|---|---|---|---|
| 6,779,151 | B2 | 8/2004 | Cahill et al. |
| 6,883,161 | B1 | 4/2005 | Chovin et al. |
| 7,490,031 | B1 | 2/2009 | Qiu |
| 7,624,372 | B1 | 11/2009 | Stewart |
| 2006/0101391 | A1 | 5/2006 | Ulke et al. |
| 2006/0112123 | A1 | 5/2006 | Clark et al. |
| 2006/0282818 | A1 | 12/2006 | DeSpain |
| 2007/0219956 | A1* | 9/2007 | Milton ............................. 707/3 |
| 2008/0098349 | A1* | 4/2008 | Lin et al. ...................... 717/106 |
| 2008/0256508 | A1 | 10/2008 | Jonsson |
| 2009/0241089 | A1 | 9/2009 | Ramamoorthy et al. |

OTHER PUBLICATIONS

El-Hajj, Ali et al., "On Using Spreadsheets for Logic Networks Simulation", Nov. 1998, IEEE Transactions on Education, vol. 41, No. 4.*
Dos Santos, Walter A. et al., "A Knowledge-Based and Model-Driven Requirements Engineering Approach to Conceptual Satellite Design", 2009, Springer-Verlag Berlin Heidelberg.*
Mozier, Jonathan D. et al., "A Formal but Non-Automated Method to Test the Sensitivity of Systems Dynamics Models", Jun. 21, 2001.*
Kempkens, Ralf et al., "Instrumenting Measurement Programs with Tools", 2000, Springer-Verlag Berlin Heidelberg.*

(Continued)

*Primary Examiner* — Kamini S Shah
*Assistant Examiner* — Cedric D Johnson
(74) *Attorney, Agent, or Firm* — Condo Roccia LLP

(57) ABSTRACT

A spreadsheet environment is used as a graphical user interface for depicting and interacting with the various aspects of a system. In particular, the spreadsheet environment supports using OMG SysML to model a system and to execute tasks associated with the systems engineering process.

20 Claims, 21 Drawing Sheets

(56) References Cited

OTHER PUBLICATIONS

Mahr, Thomas, "Pragmatic Approach to Model-Based Systems Engineering" [online], Dec. 3, 2010, [retrieved on Sep. 12, 2012]. Retrieved from the internet; <URL: ** > http://www.ohm-hochschule.de/institutionen/fakultaeten/elektrotechnik-feinwerktechnik-informationstechnik/1/prof-dr-mahr/prof-dr-mahr/modellbasierte-entwicklung/page.html>.*

InterCax, "ParaMagic v16.6, sp1 Users Guide", Sep. 9, 2010, InterCax LLC.*

Hause et al., "An Overview of Systems Modeling Language", Dec. 14, 2005, retrieved from the internet: <http://www.embedded.com/design/prototyping-and-development/4006498/An-overview-of-Systems-Modeling-Language>.*

Sparx Systems PTY. LTD., SysML MDG Technology, available at http://www.sparxsystems.com/products/mdg/tech/sysml/index.html. Retrieved Aug. 27, 2011.

No Magic, Inc., MagicDraw: Architecture Made Simple, available at https://www.magicdraw.com/sysml. Retrieved Aug. 27, 2011.

Altova, SysML for Embedded Systems Modeling, available at http://www.altova.com/umodel/sysml.html. Retrieved Aug. 27, 2011.

IBM, Rational Rhapsody Developer, available at http://www-01.ibm.com/software/rational/products/rhapsody/developer/. Retrieved Aug. 27, 2011.

Atego, Artisan Studio, available at http://www.atego.com/products/artisan-studio/. Retrieved Aug. 27, 2011.

Embedded Plus Engineering, What is OMG SysML?, available at http://www.atego.com/products/artisan-studio/. Retrieved Aug. 27, 2011.

IBM, Rational Software Architect Family, available at http://www-01.ibm.com/software/awdtools/swarchitect. Retrieved Aug. 27, 2011.

No Magic, Inc., Cameo Simulation Toolkit, available at http://www.magicdraw.com/simulation. Retrieved Aug. 27, 2011.

Intercax LLC, SysML and MBSE Training, available at http://www.intercax.com/services/sysml-mbse-training/. Retrieved Aug. 27, 2011.

El-Hajj, Ali et al., "On Using Spreadsheets for Logic Networks Simulation," Nov. 1998, IEEE Transactions on Education, vol. 41, No. 4.

Bluttman, Ken et al., "Microsoft Office Excel 2007 Formulas & Functions for Dummies," 2007, Wiley Publishing, Inc., pp. 38-39, 46, 48, 75.

PlanMaker, "Manual: PlanMaker 2006," 2006, SoftMaker Software GmbH, pp. 19, 245-246.

El-Hajj, Ali et al., "A Spreadsheet Simulation of Logic Networks," Feb. 1991, IEEE Transactions on Education, vol. 34, No. 1.

Bissett, Brian D., "Automated Data Analysis Using Excel," 2007, Taylor & Francis Group, LLC, pp. 175-178.

* cited by examiner

SPREADSHEET-BASED GRAPHICAL USER INTERFACE FOR MODELING OF PRODUCTS USING THE SYSTEMS ENGINEERING PROCESS

TECHNICAL BACKGROUND

The disclosure relates generally to computer-implemented modeling, simulation, and documentation of systems. More particularly, the disclosure relates to user interfaces for modeling, simulating, and documenting systems using a systems engineering process.

BACKGROUND

Systems Engineering (SE) is a disciplined process for developing products. Systems Engineering involves a number of sub-processes, which can be characterized as SE Management Processes or SE Technical Processes. SE Management Processes include project and resource planning, project review, and change control. SE Technical Processes include gathering customer input, defining product requirements and use scenarios, performing trade-off studies based on available technology and tools, and validating the design using established test and simulation plans. A variety of tools are available that support both SE Management Processes and SE Technical Processes. Some are meant for large enterprises with complicated products and product lines, while others are targeted at small businesses with a relatively small number of engineers and/or simpler product structure. Regardless of the target users a good SE tool should have an easy-to-use graphical interface to model the product or system. It should also have a model repository for persisting and managing product information, state of requirements, supporting change control and issue management, and allowing data entered in one view to be reflected in other views. A good SE tool should also seamlessly integrate models with tools used for performance evaluation, trade-off studies, and parameter optimization.

Some tools, hereafter called Integrated Systems Engineering Environments (ISEEs), integrate modeling, data management, and simulation capabilities into one seamless environment. For exchanging information with the larger SE community, a good ISEE should also follow community standards where available. For Technical Processes, Object Management Group Systems Modeling Language (OMG SysML) is a standardized language for depicting different product aspects in the forms of diagrams. Those diagrams include, for example, a block definition diagram for depicting how the constituent parts are associated, a requirements diagram for how the product is expected to perform, and an internal block diagram, which shows the internal working of the product, e.g., how information flows between model elements.

An example block definition diagram 200 is shown in FIG. 2. OMG SysML standards include abstract syntax, which defines the concepts in the language and how they are related, and concrete syntax, which specifies, e.g., what shapes to use for different diagram elements (rectangles 202, arrowheads 204, line styles, etc.), special delimiters and keywords, e.g., <<block>>, as well as acceptable abbreviation (bdd for block definition diagram). In addition to diagrams, the OMG SysML language also specifies tables, matrices and trees for depicting allocation and hierarchical relationships. OMG SysML specifications are available at http://www.sysml.org.

Commercial products are available for modeling systems using the various diagram types specified in the OMG SysML language. Plug-ins to those products provide additional functionalities not specified by OMG SysML. Some plug-ins, for example, can validate system behavior by executing the models depicted in an activity diagram.

SUMMARY OF THE DISCLOSURE

According to various example embodiments, a spreadsheet environment is used as a graphical user interface for depicting and interacting with the various aspects of a system. In particular, the spreadsheet environment supports using OMG SysML to model a system and to execute tasks associated with the systems engineering process.

One embodiment is directed to a method of modeling a system comprising a plurality of components. A computer is used to provide a spreadsheet environment. Shape objects are defined within the spreadsheet environment. The shape objects represent the components of the system. At least one component is a subsystem comprising a plurality of elements. The spreadsheet environment is used to interact with a plurality of applications for working with the system and to generate a plurality of diagrams of the system in a graphical system modeling language, such as OMG SysML. The plurality of diagrams reflect a requirements view, an activities view, a hierarchical view, a parametric view, a component and subsystem interaction view, a state transition view, and a cross allocation view. The spreadsheet environment is used to diagram a plurality of system models for dynamic system simulation, process automation, and performance index calculations. A macro in the spreadsheet environment is used to perform at least one action on at least one of the system models. The system model is stored using a workbook in the spreadsheet environment, and can be used to simulate the system's behavior. This method may be implemented in a computer-readable storage medium or in a computer system.

Because the spreadsheet environments are ubiquitous in the worlds of engineering and information technology, learning it as a tool will be relatively easy for systems engineering practitioners. More importantly, since OMG SysML diagrams are done with shapes in a spreadsheet environment, integration of those diagrams with other objects in the spreadsheet environment, such as pivot tables, cells, charts, hyperlinks, refedits, etc., provides a powerful combination that will improve an engineer's productivity. From a development viewpoint, using a spreadsheet environment as a platform allows the leverage of technology out of the box, such as security protection, privacy control, etc., that are common to Microsoft's OFFICE® productivity suite. Finally, developers can leverage the interoperability between the EXCEL® spreadsheet environment and the .Net framework, including Microsoft's Windows Communication Foundation and Windows Presentation Foundation, to provide attractive and effective user interfaces.

DESCRIPTION OF VARIOUS EMBODIMENTS

According to various embodiments, a spreadsheet environment, such as Microsoft's EXCEL® spreadsheet environment or OpenOffice.org Calc, is used as a graphical user interface (GUI) for depicting and interacting with the various aspects of a system. In particular, the spreadsheet environment supports using OMG SysML to model a system, and to execute tasks associated with the systems engineering process.

Figure 1:
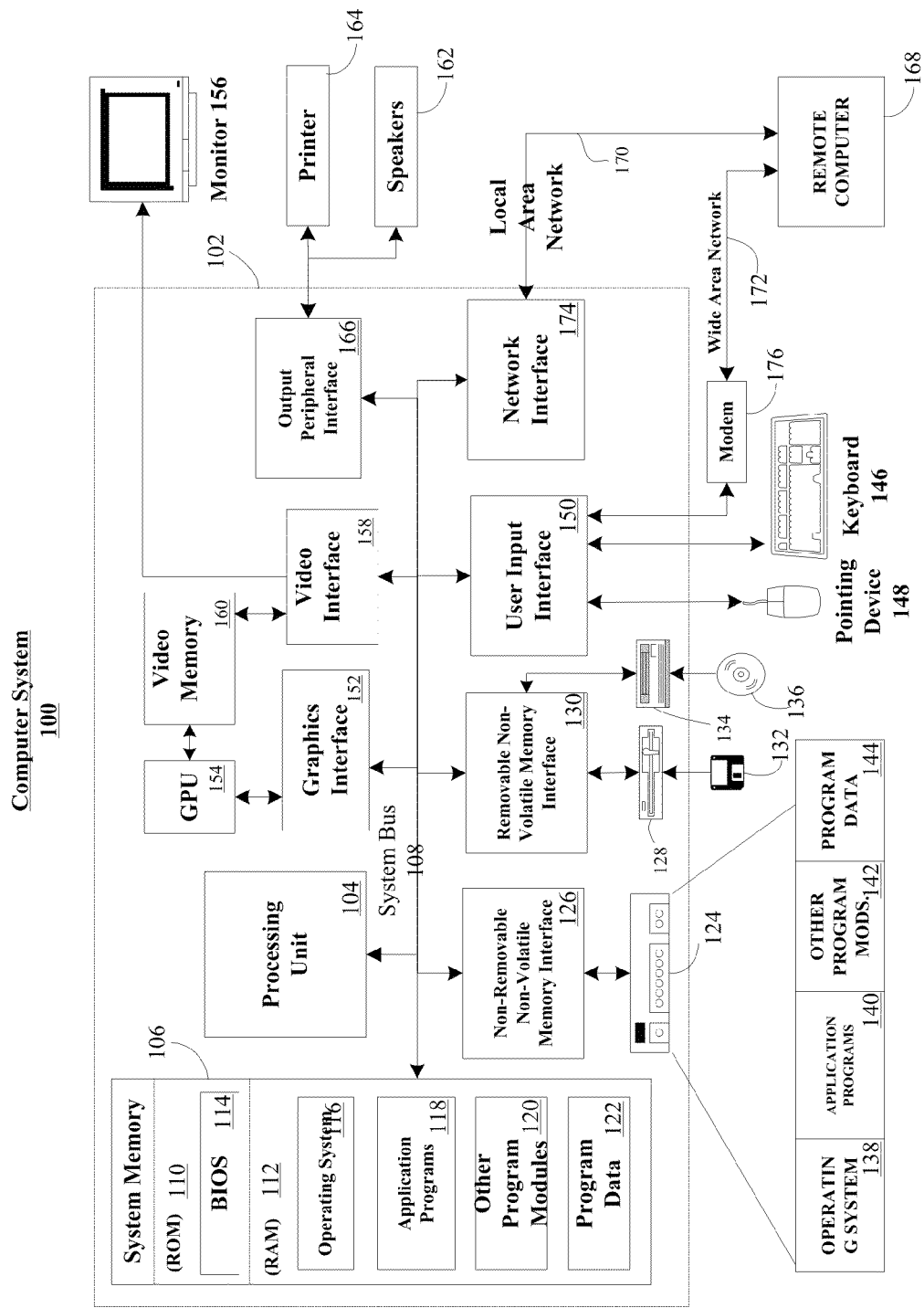
FIG. 1 is a block diagram illustrating a computer system that can be programmed to implement various embodiments.
Figure 2:
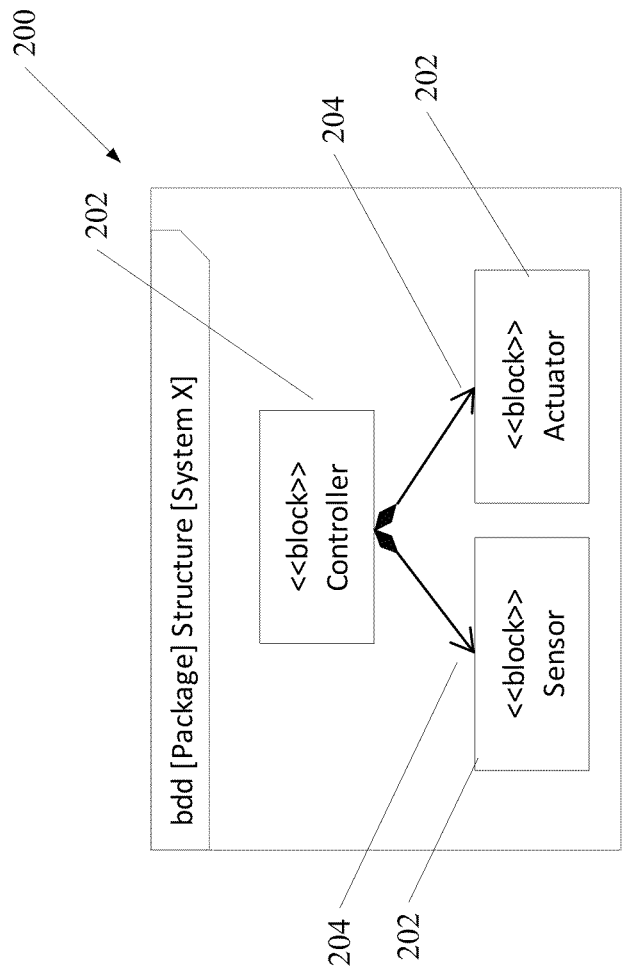
FIG. 2 is a diagram illustrating a conventional block definition diagram used in connection with a systems modeling language.

Referring now to the drawings, FIG. 1 is a block diagram illustrating a computer system 100 that can be programmed to implement various embodiments described herein. The computer system 100 is only one example of a suitable computing environment and is not intended to suggest any limitation as to the scope of use or functionality of the subject matter described herein. The computer system 100 should not be construed as having any dependency or requirement relating to any one component or combination of components shown in FIG. 1.

The computer system 100 includes a general computing device, such as a computer 102. Components of the computer 102 may include, without limitation, a processing unit 104, a system memory 106, and a system bus 108 that communicates data between the system memory 106, the processing unit 104, and other components of the computer 102. The system bus 108 may incorporate any of a variety of bus structures including a memory bus or memory controller, a peripheral bus, and a local bus using any of a variety of bus architectures. These architectures include, without limitation, Industry Standard Architecture (ISA) bus, Enhanced ISA (EISA) bus, Micro Channel Architecture (MCA) bus, Video Electronics Standards Association (VESA) local bus, and Peripheral Component Interconnect (PCI) bus, also known as Mezzanine bus.

The computer 102 also is typically configured to operate with one or more types of processor readable media or computer readable media, collectively referred to herein as "processor readable media." Processor readable media includes any available media that can be accessed by the computer 102 and includes both volatile and non-volatile media, and removable and non-removable media. By way of example, and not limitation, processor readable media may include storage media and communication media. Storage media includes both volatile and non-volatile, and removable and non-removable media implemented in any method or technology for storage of information such as processor-readable instructions, data structures, program modules, or other data. Storage media includes, but is not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the computer 102. Communication media typically embodies processor-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor readable media.

The system memory 106 includes computer storage media in the form of volatile memory, non-volatile memory, or both, such as read only memory (ROM) 110 and random access memory (RAM) 112. A basic input/output system (BIOS) 114 contains the basic routines that facilitate the transfer of information between components of the computer 102, for example, during start-up. The BIOS 114 is typically stored in ROM 110. RAM 112 typically includes data, such as program modules, that are immediately accessible to or presently operated on by the processing unit 104. By way of example, and not limitation, FIG. 1 depicts an operating system 116, application programs 118, other program modules 120, and program data 122 as being stored in RAM 112.

The computer 102 may also include other removable or non-removable, volatile or non-volatile computer storage media. By way of example, and not limitation, FIG. 1 illustrates a hard disk drive 124 that communicates with the system bus 108 via a non-removable memory interface 126 and that reads from or writes to a non-removable, non-volatile magnetic medium, a magnetic disk drive 128 that communicates with the system bus 108 via a removable memory interface 130 and that reads from or writes to a removable, non-volatile magnetic disk 132, and an optical disk drive 134 that communicates with the system bus 108 via the interface 130 and that reads from or writes to a removable, non-volatile optical disk 136, such as a CD-RW, a DVD-RW, or another optical medium. Other computer storage media that can be used in connection with the computer system 100 include, but are not limited to, flash memory, solid state RAM, solid state ROM, magnetic tape cassettes, digital video tape, etc.

The devices and their associated computer storage media disclosed above and illustrated in FIG. 1 provide storage of computer readable instructions, data structures, program modules, and other data that are used by the computer 102. In FIG. 1, for example, the hard disk drive 124 is illustrated as storing an operating system 138, application programs 140, other program modules 142, and program data 144. These components can be the same as or different from the operating system 116, the application programs 118, the other program modules 120, and the program data 122 that are stored in the RAM 112. In any event, the components stored by the hard disk drive 124 are different copies from the components stored by the RAM 112.

A user may enter commands and information into the computer 102 using input devices, such as a keyboard 146 and a pointing device 148, such as a mouse, trackball, or touch pad. Other input devices, which are not shown in FIG. 1, may include, for example, a microphone, a joystick, a game pad, a satellite dish, a scanner, a camera, or the like. These and other input devices may be connected to the processing unit 104 via a user input interface 150 that is connected to the system bus 108. Alternatively, input devices can be connected to the processing unit 104 via other interface and bus structures, such as a parallel port, a game port, or a universal serial bus (USB).

A graphics interface 152 can also be connected to the system bus 108. One or more graphics processing units (GPUs) 154 may communicate with the graphics interface 152. A monitor 156 or other type of display device is also connected to the system bus 108 via an interface, such as a video interface 158, which may in turn communicate with video memory 160. In addition to the monitor 156, the computer system 100 may also include other peripheral output devices, such as speakers 162 and a printer 164, which may be connected to the computer 102 through an output peripheral interface 166.

The computer 102 may operate in a networked or distributed computing environment using logical connections to one or more remote computers, such as a remote computer 168. The remote computer 168 may be a personal computer, a server, a router, a network PC, a peer device, or another common network node, and may include many or all of the components disclosed above relative to the computer 102. The logical connections depicted in FIG. 1 include a local area network (LAN) 170 and a wide area network (WAN) 172, but may also include other networks and buses. Such networking environments are common in homes, offices, enterprise-wide computer networks, intranets, and the Internet.

When the computer 102 is used in a LAN networking environment, it may be connected to the LAN 170 through a wired or wireless network interface or adapter 174. When used in a WAN networking environment, the computer 102 may include a modem 176 or other means for establishing communications over the WAN 172, such as the Internet. The modem 176 may be internal or external to the computer 102 and may be connected to the system bus 108 via the user input interface 150 or another appropriate component. The modem 176 may be a cable or other broadband modem, a dial-up modem, a wireless modem, or any other suitable communication device. In a networked or distributed computing environment, program modules depicted as being stored in the computer 102 may be stored in a remote memory storage device associated with the remote computer 168. For example, remote application programs may be stored in such a remote memory storage device. It will be appreciated that the network connections shown in FIG. 1 are exemplary and that other means of establishing a communication link between the computer 102 and the remote computer 168 may be used.

Installation of XLSE Add-In

According to various example embodiments, a spreadsheet environment, such as Microsoft's EXCEL® spreadsheet environment or OpenOffice.org Calc, is used as a graphical user interface (GUI) for depicting and interacting with various aspects of a product. An add-in that provides additional features and functionalities, hereafter called the XLSE add-in, enables the EXCEL® spreadsheet environment to serve as an SE tool interface. The XLSE add-in can be written, for example, in Visual Basic for Applications (VBA), the macro editor shipped with every copy of the EXCEL® spreadsheet environment. Alternatively, the XLSE add-in can be developed using Microsoft Visual Studio (VS), which is integrated with the EXCEL® spreadsheet environment. Practitioners skilled in VBA or VS should be familiar with how the macros, scripts, and other language elements are constructed, packaged, and deployed to the user desktop. In addition, templates may be installed in each workbook that uses the XLSE add-in to store static information, such as version numbers and default values for simulation parameters. Templates may also be used to reduce coding in setting the appearance of commonly used worksheets. In the following description, numerous specific details are set forth in order to provide a thorough understanding of various embodiments. It will be apparent to one skilled in the art that some embodiments may be practiced without some or all of these specific details. In other instances, well known components and process steps have not been described in detail.

Integrated Systems Engineering Environment (ISEE) Compared to Other System Types Spreadsheets have been used as a graphical user interface (GUI) for many purposes, including building applications, modeling workflow, modeling business processes, and modeling and simulating dynamic systems. Unlike these conventional applications, however, various embodiments described herein use a spreadsheet environment, such as the EXCEL® spreadsheet environment or OpenOffice.org Calc, as a GUI of an ISEE.

Modeling and simulating a technical system differs substantially from simulating workflows, performing business analytics, and modeling and simulating dynamic systems in a number of ways. For example, the objective of simulating a dynamic system is to mimic the behavior of related physical or logical entities over time. This may be done, for example, to support system design and validation. Business analytics applications are concerned with collecting data over time, and do not mimic the behavior of systems having physical or logical components. Business analytics are often used in support of business decisions, such as when to buy or sell a stock or when to replenish a supply or a resource. Workflow simulators mimic the flow of work from one station to another in which human or machines are often involved, but the stations are generally not assumed to have characteristics or behaviors that change over time. Example applications of workflow simulators include, for example, calculating throughput, identifying bottlenecks in a workflow, and optimizing resource consumption.

In contrast with dynamic systems, business analytics, and workflows, an ISEE is intended to support product development at the system through component levels. For example, using an ISEE, a systems engineer can decompose the functional requirements of a product and map them to the subsystems of candidate concept designs. High level design principles such as axiomatic design can be applied during this stage to improve performance robustness. Other factors, including cost and market segmentation, are often taken into account at this time. The system engineer can down-select to one or two design concepts by performing trade-off studies at the system level, and pass the concepts to a team of engineers for further development, including design drawing, detailing, performance simulation, and test. Alternatively, using set-based concurrent engineering, the system engineer may postpone concept down-selection and let several groups work on development issues at the same time as they converge on a solution. Performance scope can include various aspects of a product, ranging from noise and fuel economy that can be calculated by dynamic systems simulators, to perceived quality that can be determined by neural network modeling, to fit and finish that can be assessed by observation. Often the ISEE is used to support decisions while resolving conflicts among competing requirements. The model hierarchy in an ISEE should support drill down. For example, starting at the system level, the user should be able to view the requirement status (e.g., red, yellow, or green) in progressively increasing levels of detail. For instance, if the ISEE indicates that the requirement status of the system as a whole is red—meaning that requirements have not been met—the user should be able to see which subsystems or performance indicators cause the system's requirement status to be indicated as red. Similarly, if the ISEE indicates that the requirement status of a particular subsystem is red, the user should be able to see which components or performance indicators cause that subsystem's requirement status to be indicated as red. The modeling of a technical system from a systems engineering perspective is thus much broader in scope, deeper in model hierarchy, and longer in product life cycle when compared to business analytics, and workflow and dynamic system modeling and simulation.

Overall ISEE System Architecture

Figure 3:
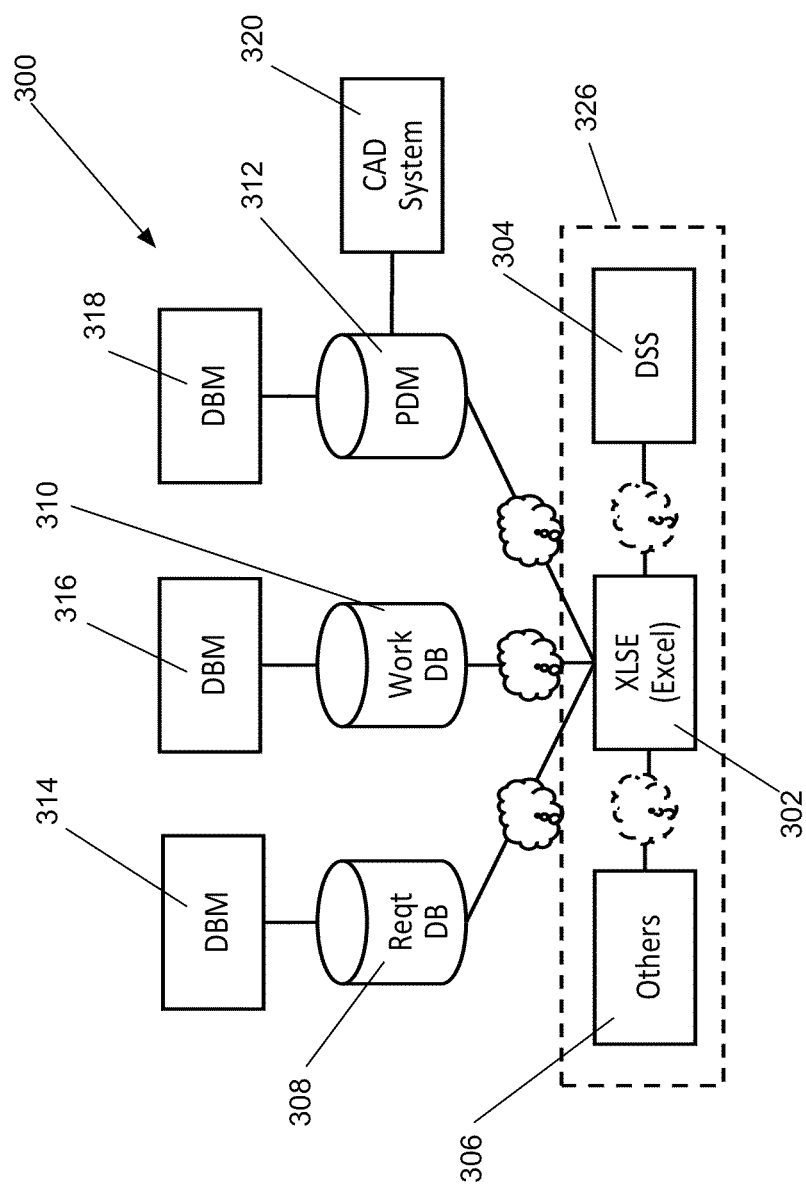
FIG. 3 is a block diagram illustrating an example architecture of an ISEE according to one embodiment.

An ISEE is often a federated system of applications. That is, unlike a dynamic system simulator or workflow simulator, which tends to be a monolithic piece of software, an ISEE typically has an application that serves as the access point for modeling, as a system, the product and the resources and processes required to develop the product. It also is the access point to view and update a product's development status, and where appropriate, to initiate development work such as performing a simulation or a test, and ordering hardware. The ISEE typically includes other applications and other components, such as databases, that are needed in working with a system model. FIG. 3 is a block diagram illustrating a high level view of an example architecture of an ISEE 300 according to one embodiment. The EXCEL® spreadsheet environment, enhanced with an XLSE add-in 302, allows the user to author the diagrams that depict the various aspects of a product using the OMG SysML modeling language. The ISEE 300 also includes a dynamic system simulator (DSS) 304 and may include other performance simulation tools 306. The ISEE 300, particularly the XLSE add-in 302, may access a number of databases, such as a requirements database 308, a work database 310 for managing work requests and status, and a products database (PDM) 312. These databases may be managed using respective database managers (DBMs) 314, 316, and 318. In addition, the PDM 312 may be configured to work with a CAD system 320. The XLSE add-in 302, the DSS 304, and the performance simulation tools 306 can be implemented as components of a process automation tool 326. According to various embodiments, the EXCEL® spreadsheet environment, enhanced with the XLSE add-in 302, is used to interact with various components of the federated system, such as the DSS 304; the performance simulation tools 306; the databases 308, 310, and 312; the database managers 314, 316, and 318; and/or the CAD system 320. Usage of the databases as components of an ISEE is described in more detail later in this disclosure.

In some embodiments, navigation aids built into the diagrams allow the user to view the model at different levels and from different perspectives. Moreover, macros linked to the diagrams can be used to perform tasks that are described in more detail later in this disclosure.

Modeling a System Using the XLSE Add-In

Figure 18:
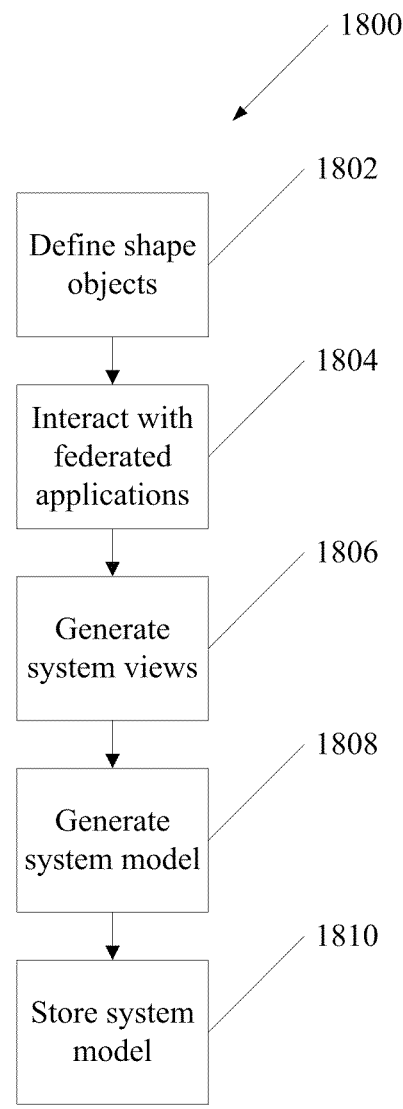
FIG. 18 is a flow diagram illustrating an example method for modeling a system.

FIG. 18 is a flow diagram illustrating at a high level a computer-implemented method 1800 for modeling a system. A computer is used to provide a spreadsheet environment. Shape objects are defined within the spreadsheet environment at a step 1802. The shape objects represent the components of the system. At least one component is a subsystem comprising a plurality of elements. The spreadsheet environment is used to interact with a plurality of applications for working with the system at a step 1804 and to generate a plurality of views of the system in a graphical system modeling language, such as OMG SysML, at a step 1806. The plurality of views include a requirements view, an activities view, a hierarchical view, a parametric view, and a component and subsystem interaction view as depicted in an internal block diagram and cross allocation table or view. A system model is generated at a step 1808 by using the spreadsheet environment to define relationships between the components of the system. At a step 1810, the system model is stored using a workbook in the spreadsheet environment.

Figure 3A:
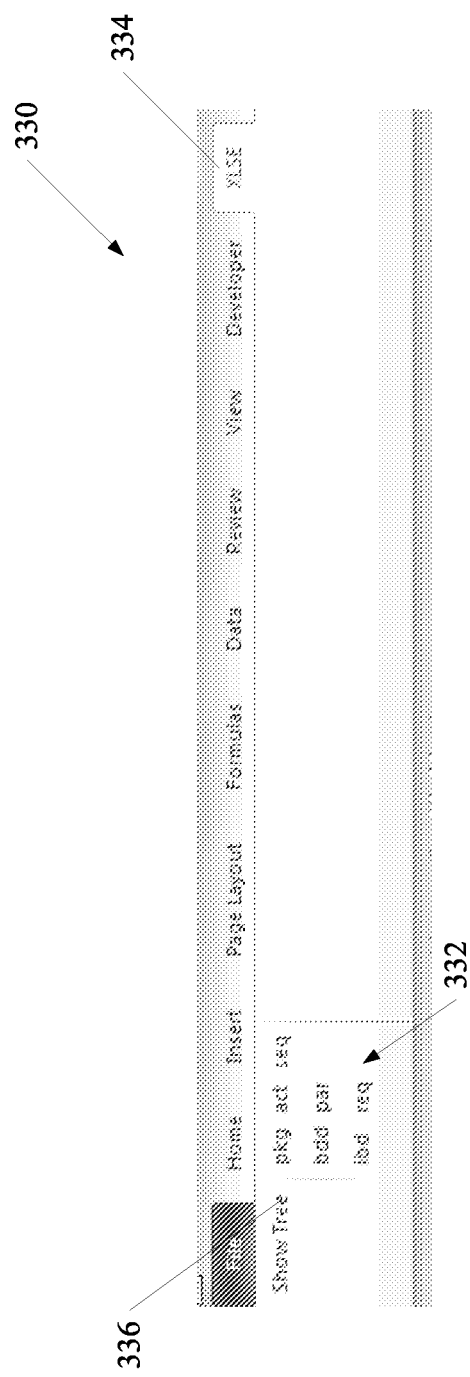
FIG. 3a is a diagram illustrating an example user interface for interacting with an ISEE.
Figure 3B:
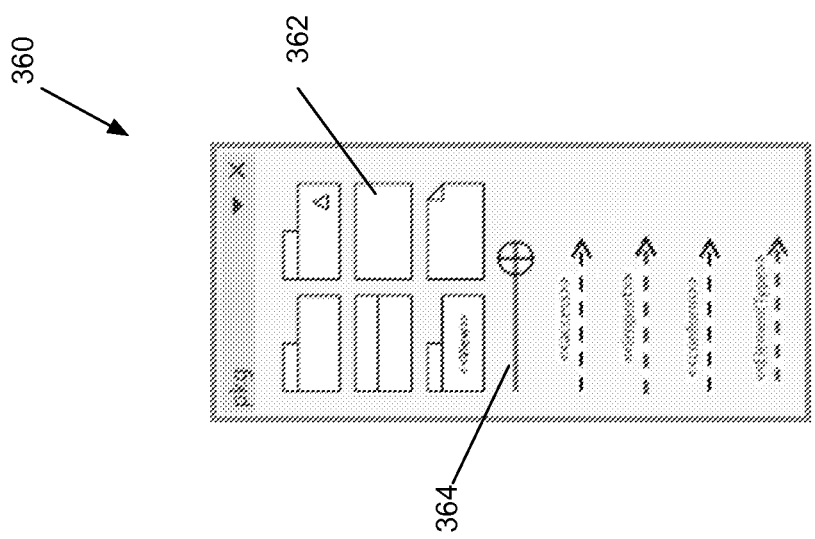
FIG. 3b is a diagram illustrating an example palette for constructing a package diagram.

Within the spreadsheet environment, a worksheet is used as a canvas for drawing OMG SysML diagrams. For drawing a diagram, the XLSE add-in augments native drawing functions in the spreadsheet environment by providing a set of command buttons, for example, in a Ribbon interface 330 of Microsoft's EXCEL® spreadsheet environment, as shown in FIG. 3a. In this interface 330, command buttons 332 within an XLSE tab 334 are mapped to OMG SysML diagram types. When one of the command buttons 332 is clicked, the XLSE add-in will display a palette of nodes and paths that are used in constructing the selected diagram type. In OMG SysML, the term node denotes a two dimensional object, such as a rectangle, and the term path denotes a line or an elbow. For example, FIG. 3b illustrates an example palette 360 for constructing a package diagram. The palette 360 includes a simple rectangular block 362 as well as a containment path 364, symbolized as a line with a circular crosshair at its end. In general, a menu will consist of OMG SysML modeling elements, namely, nodes, paths, tables, matrices, and trees. Dialogs may be presented to capture data such as block name and import aliases needed in drawing the model elements.

Figure 4:
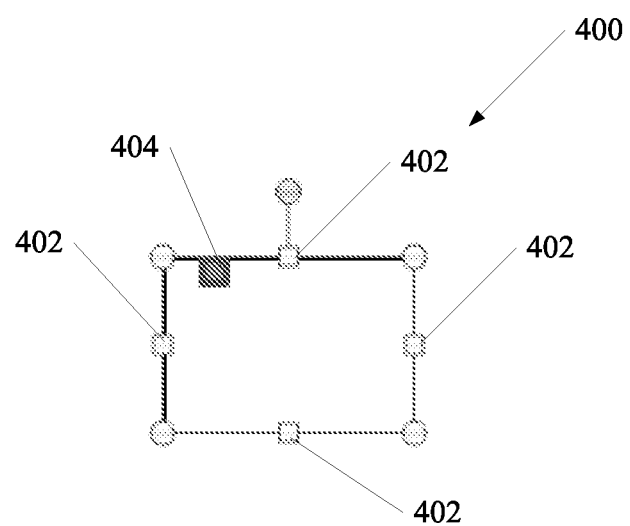
FIG. 4 is a diagram illustrating a shape in a spreadsheet environment having connection points.

To create a diagram, the user first selects various nodes from the aforementioned menus and palettes and connects them as needed with paths. For connecting a pair of nodes, the user first selects the pair and then clicks on the desired path. The XLSE add-in will connect the nodes with connectors that are native to the spreadsheet environment, such as lines and elbows. A dialog may be presented to capture additional data needed in drawing the path, e.g., import aliases. Alternatively, users can make the connections as one normally would with connectors, e.g., to fixed sites that are available in shapes in the spreadsheet environment, such as the four small rectangular midpoints 402 in the rectangle 400 shown in FIG. 4. In some versions of the spreadsheet environment, the midpoints 402 may appear, for example, as red dots when the end of a connector is brought to the vicinity of the shape 400.

Figure 5:
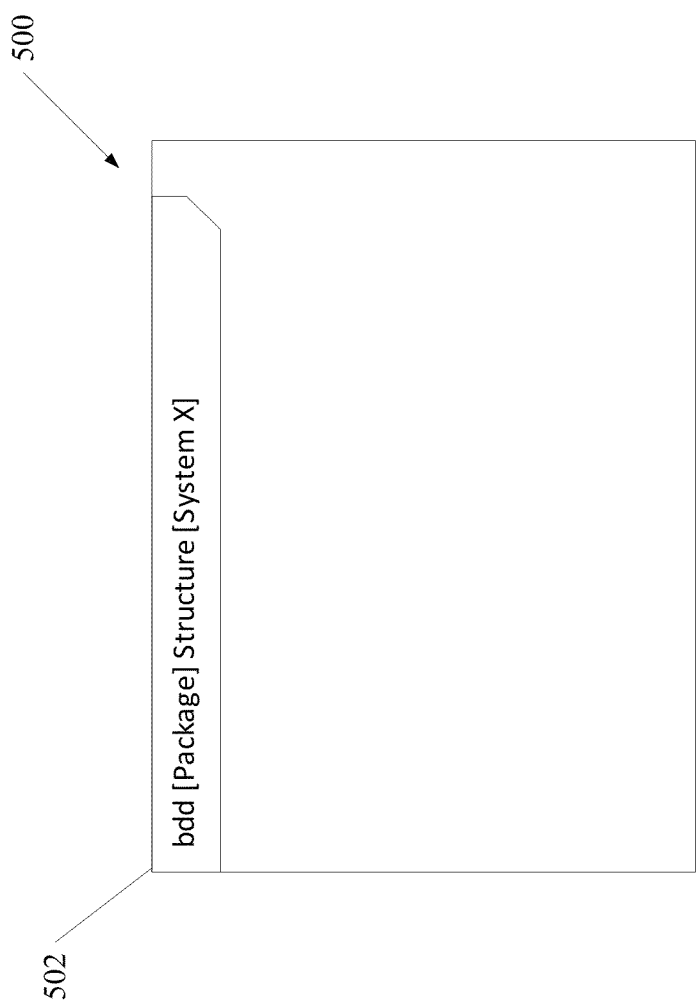
FIG. 5 is a diagram illustrating a diagram frame defined as a combination of other shapes in a spreadsheet environment.

However, in some cases the user may want to connect to a different location. Connecting to other locations can be facilitated by adding a small rectangle 404 that is then grouped with the node. The added rectangle 404 acts as a target for a path to connect to. It also provides a shape that can be pointed to by a connectorformat object in the EXCEL® spreadsheet environment. Since the native EXCEL® spreadsheet environment provides only a limited set of basic shapes, such as rectangles and ovals, many OMG SysML drawing elements need to be constructed as composites of basic shapes, i.e., by grouping and aligning basic shapes. For example, a diagram frame 500 shown in FIG. 5 can be constructed from two basic shapes that are aligned at an upper left corner 502. The rectangle 404 of FIG. 4 facilitates establishing this alignment. Another example is the containment path 364 of FIG. 3*b*, which can be drawn by joining a line with a crosshair.

Figure 6:
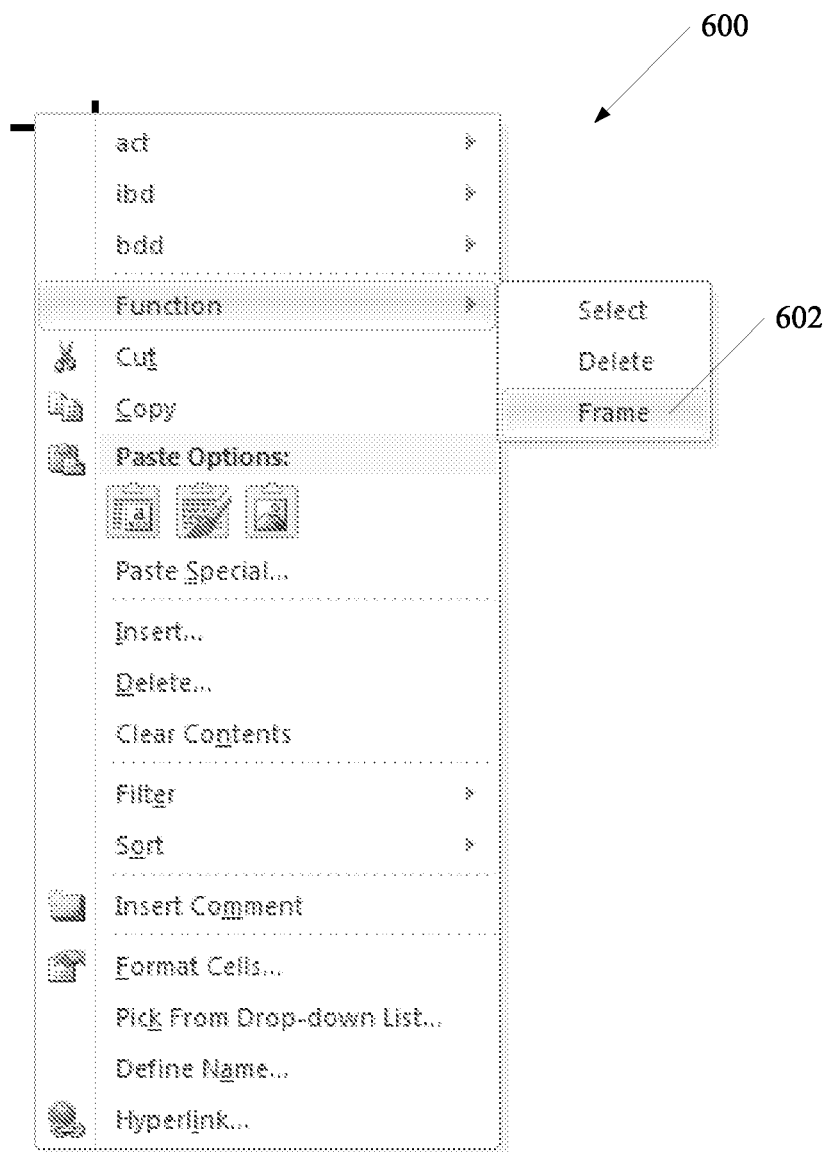
FIG. 6 is a diagram illustrating a context-sensitive menu.

Macros may be used to automate diagram creation tasks. For example, after drawing the nodes and connecting the nodes with paths, the user can select a frame command 602 from a context sensitive menu 600 of FIG. 6 to create a diagram frame of appropriate type and size to enclose the nodes and paths. Diagrams and model elements may be deleted and modified as shapes normally would be in the spreadsheet environment.

Text strings are an integral part of OMG SysML drawing elements. Keywords with a fixed format in the interior of a shape, such as the abbreviation bdd in FIG. 5, can be inserted programatically. Variable strings to be supplied by the user can be entered manually after the shapes are drawn, or inserted programatically. Inserting variable strings programatically may require using dialogs to capture the required data.

Figure 7:
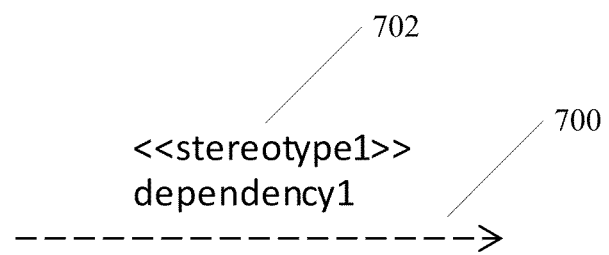
FIG. 7 is a diagram depicting a line with a text string attached to the line.

FIG. 7 depicts a line 700 with a text string 702 attached to the line 700. Text strings attached to a line, such as the text string 702, can be inserted programmatically into a textbox then grouped with the line 700. A command button or a dialog may be used to toggle text visibility, which is useful in controlling the appearance of a diagram.

Identifying the nodes that are connected to a path can facilitate using a diagram programmatically. This can be done by using the connectorformat object in conjunction with an endconnectedshape or beginconnectedshape. Alternatively, nodes that are connected to a path can be identified by comparing the x,y coordinates of a path's end point to the x,y location of the node's target location. For computational performance, it may be advantageous to save the connectivity information in a worksheet to reduce the need to recompute connectivity information.

Tables and matrices may be added to diagrams in the form of spreadsheet ranges. Shapes and other icons that are not part of the model, such as command buttons and illustrative pictures, can be added to a worksheet to provide functionalities.

Model Organization

Figure 8:
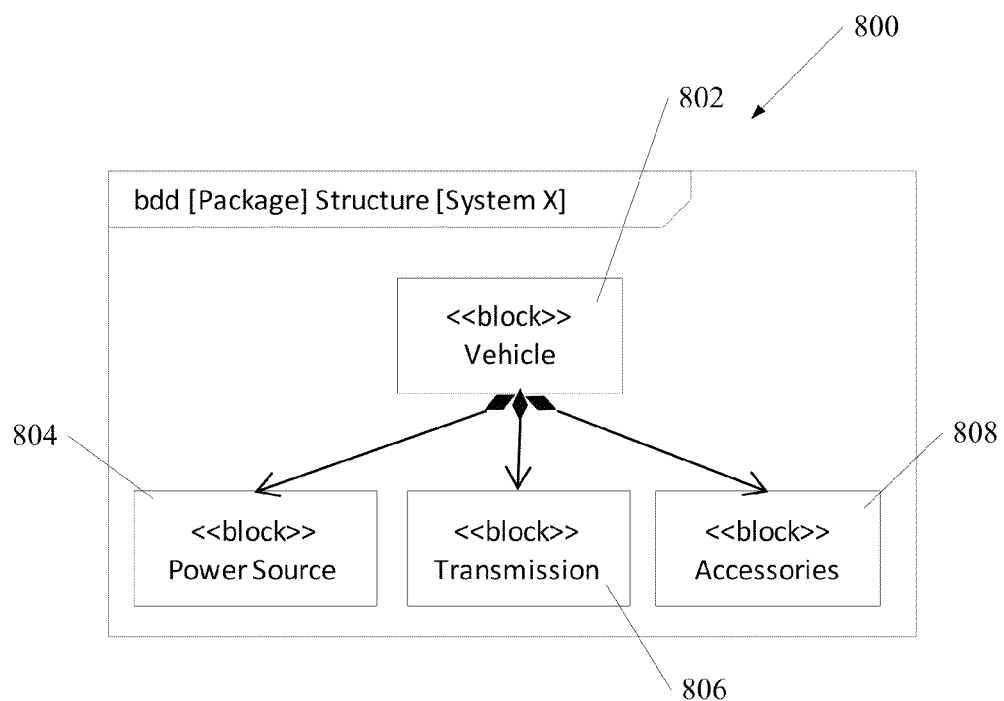
FIG. 8 is a diagram illustrating an example block definition diagram.
Figure 9:
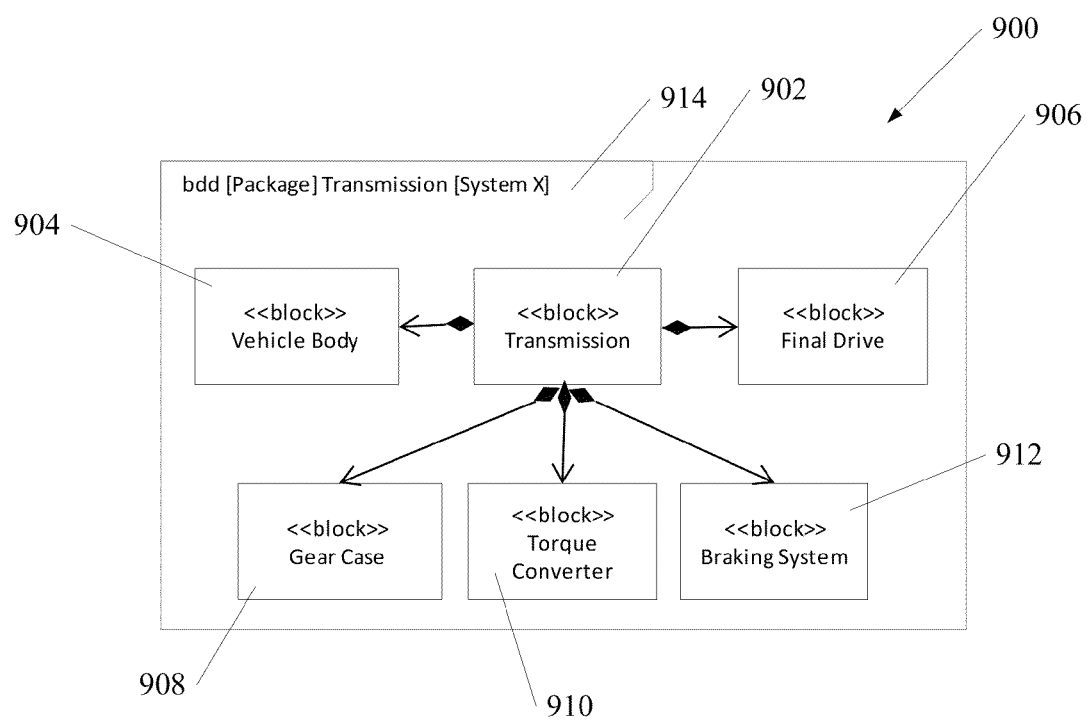
FIG. 9 is a diagram illustrating an example block definition diagram for one of the components of the block definition diagram of FIG. 8.

Model organization is important in providing a logical and efficient way to access and view the system from different perspectives. This is particularly true for complex products with many diagrams. Toward this end, the user may want to store the diagrams in various worksheets and workbooks. Hyperlinks strategically placed in nodes, paths, tables, and other model elements can then be used to traverse the model tree. For example, FIG. 8 illustrates an example block definition diagram (bdd) 800 for a vehicle. The bdd 800 includes a Vehicle block 802, a Power Source block 804, a Transmission block 806, and an Accessories block 808. Clicking on the hyperlink attached to the Transmission block 808 in FIG. 8 will activate a worksheet and bring another diagram representing the Transmission block 808 into view. FIG. 9 illustrates an example block definition diagram (bdd) 900 representing the Transmission block 808. The bdd 900 includes a Transmission block 902, a Vehicle Body block 904, a Final Drive block 906, a Gear Case block 908, a Torque Converter block 910, and a Braking System block 912. Hyperlinks attached to a Transmission block header 914 will close the workbook and return control to the higher level diagram, i.e., the bdd 800.

Figure 10:
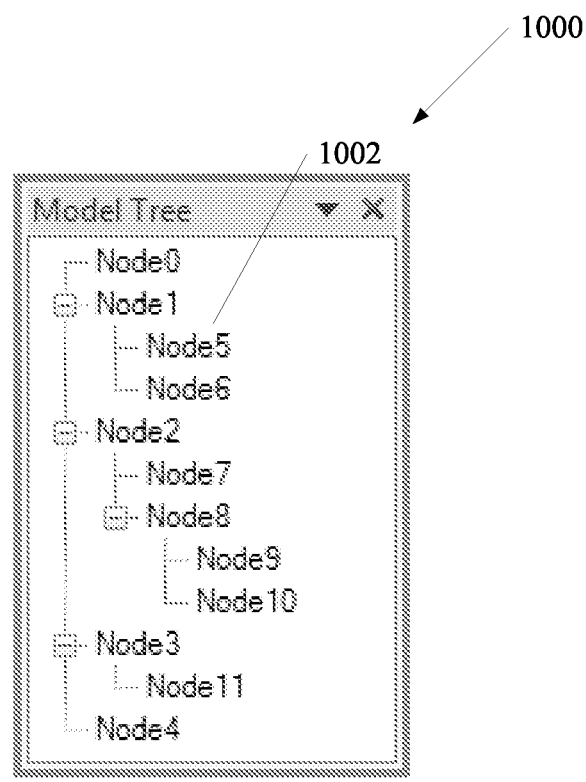
FIG. 10 is a diagram illustrating an example tree control.
Figure 10A:
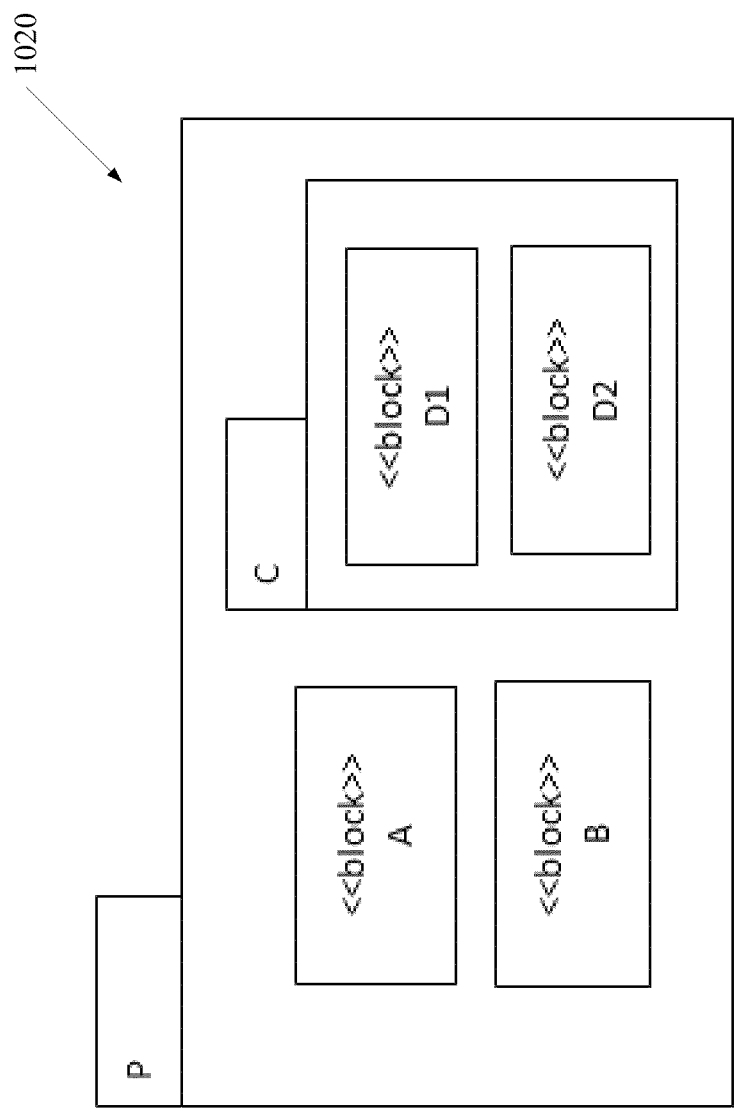
FIG. 10a is a diagram depicting an example package diagram.

Hyperlinks can be inserted manually or programmatically using information in the package diagram, block definition diagram, and internal block diagram. Alternatively, for navigating the model, a tree control, such as a tree control 1000 shown in FIG. 10, may be displayed to the user when a Show Tree command button 336 in FIG. 3*a* is clicked. Clicking on a leaf 1002 in FIG. 10 will activate the worksheet containing the corresponding diagram. To determine the hierarchy required in constructing a model tree, one may, for example, use the element location and position depicted in a package diagram. FIG. 10*a* illustrates an example package diagram 1020. From the example package diagram 1020, it can be deduced that blocks A, B, and C are children of block P, while blocks D1 and D2, as children of block C, are grandchildren of block P. OMG SysML provides other ways of describing the hierarchy, e.g., using the containment path in a package diagram, or whole-part composition relationship in a structural diagram. Appropriate techniques can be developed for those alternative means of depicting a hierarchy.

The physical organization of the workbooks is for the user to decide. For example, the user may want to group the diagrams by subsystems, e.g., powertrain in one workbook, and chassis in another. Diagrams in external workbooks may be imported using an OMG SysML import path. To facilitate access, file paths may be used as part of model element names.

Usage of OMG SysML Models

The various diagrams included in an OMG SysML models can be used to document a system, and as such, serve as a valuable communication tool. But the diagrams, particularly when drawn in a spreadsheet environment, may have other usages.

Figure 11:
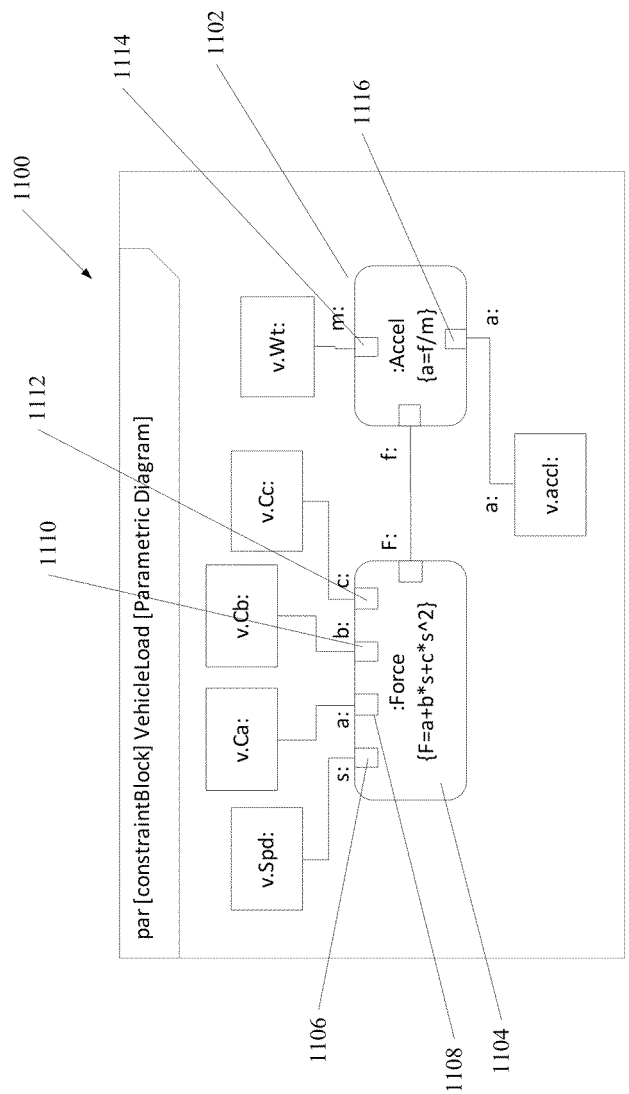
FIG. 11 is a diagram illustrating an example parametric diagram.

As an example, variables in a system may be related by relatively simple equations. For example, the load on a vehicle can be estimated from the vehicle speed s as $F=a+b*s+c*s^2$, where the coefficients a, b, and c are vehicle specific. The vehicle deceleration during coast-down on a flat terrain can in turn be calculated by Newton's law, $a=f/m$. In OMG SysML, the relationship among variables can be depicted with a parametric diagram. FIG. 11 depicts an example parametric diagram 1100. By mapping cells or ranges in a spreadsheet to the variables and setting the cell formulae to text extracted from textranges in rounded rectangles 1102 and 1104, the calculation capabilities of the spreadsheet environment can be used to update the vehicle acceleration whenever any of the variables at inputs 1106, 1108, 1110, 1112, 1114, and 1116 changes. Associated (linked) text strings in a block compartment and corresponding values in a requirement table can also be updated automatically.

In some embodiments, information needed for performance simulation of dynamic systems may include what components are in the system, information relating to signal and energy flow between components, initial conditions, loading, and component properties. The information can be found in several diagram types, including:

Block definition diagram (bdd), which shows the association of various system components, and may contain component properties in their value block compartments;

Internal block diagram (ibd), which shows how components are connected and what items (energy, fluid, current, etc.) flow between blocks;

Parametric diagram (par), which shows how variables are related, typically through equations;

Activity diagram (act), which shows how one or more input variables are transformed into output; and State machine diagram (stm), which shows how entities transition from one state to the next as triggered by events.

Each of these diagrams represents a corresponding model of the system. For instance, the state machine diagram represents a state machine model of the system.

To launch a dynamic system simulation, the user may create a simulation model from one or more aforementioned OMG SysML diagrams. The methods and algorithms for doing so depend on the dynamic systems simulator, otherwise called the solver. For example, for Modelica solvers, the XLSE add-in will recognize standard Modelica modeling components such as inertia, spring, resistor, etc. For Math Works' SIMULINK® software, the XLSE add-in needs to recognize similarly named components.

Figure 12:
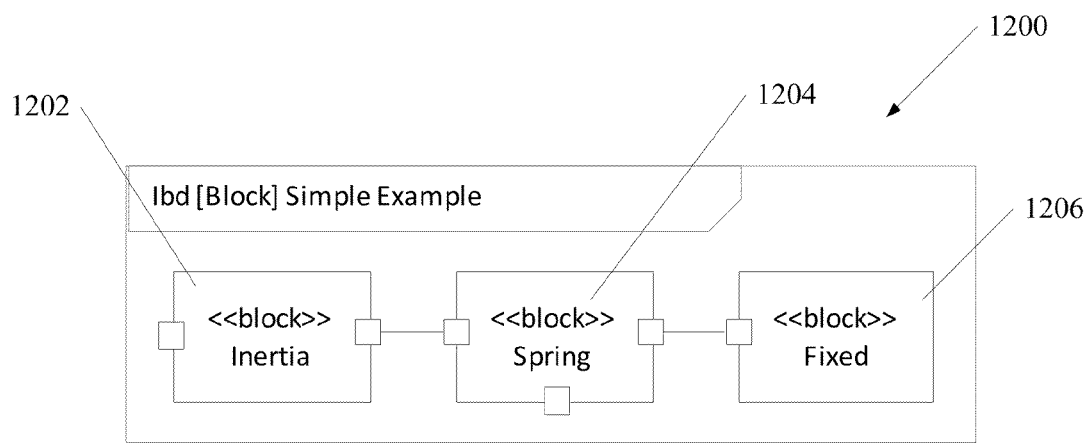
FIG. 12 illustrates an example internal block diagram (ibd) that is used to depict a simple system.

Regardless of the target solver, the creation of the simulation model involves determining the components' connectivity. Methods for determining connectivity are well known to those of ordinary skill in the art. FIG. 12 illustrates an example internal block diagram (ibd) 1200 that is used to depict a simple system. The ibd 1200 includes an Inertia block 1202, a Spring block 1204, and a Fixed block 1206. The XLSE add-in creates a simulation model file that states, in essence, that the inertia is connected to the spring, which is in turn connected to fixed (ground). In addition to the component connectivity, the simulation model also specifies the component properties. For the example, the required properties are the inertia, the spring rate, and the initial velocity and displacement of the inertia. Component properties can be found in a block's value compartments (not shown in the example) of an ibd or bdd.

Model elements such as inertia, spring, and fixed are not part of OMG SysML. Hence, the user needs to define them as user-defined classes that comform to the target solver requirements. For the Modelica solver, a workteam is defining a set of modeling classes, called the SysML4Modelica profile, which can be used by the systems engineering community. The methods and algorithms disclosed herein can be adapted to utilize the SysML4Modelica profile when it becomes available.

State machines are sometimes appropriate in modeling and simulating a dynamic system in which parts of the system may be in one of several possible states. An example is a vehicle transmission system, which may be in neutral, reverse, or one of several forward driving gears. OMG SysML provides a set of standard graphical and textual notations for describing how change of gears occurs. Parsing algorithms can be developed that recognize the blocks associated with the states, as well as actions that are executed upon, e.g., entry or exit of a block. The algorithms are similar to those used in parsing the diagram for process automation, as described below in connection with FIG. 16. Information gleaned from parsing can be used in a dynamic system simulator that supports state machine, including Modelica and Math Works' STATEFLOW® software.

A command button can be placed in a diagram for launching a simulation. After the simulation is completed, the results can be saved to the same workbook where the simulation was launched. The charting capabilities of the spreadsheet environment can be used to visualize the results.

Figure 13:
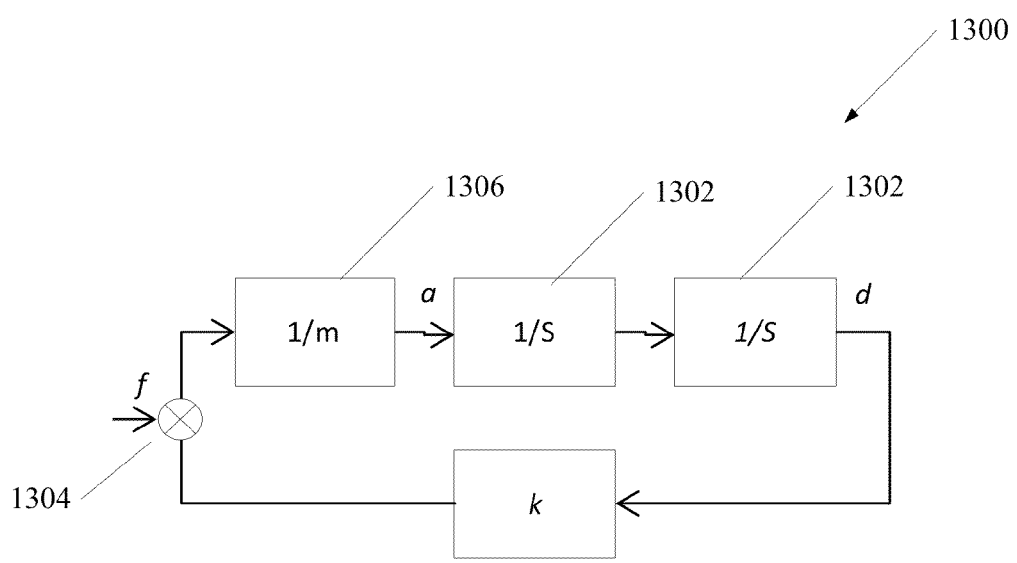
FIG. 13 depicts an example system diagram that models a simple system.
Figure 14:
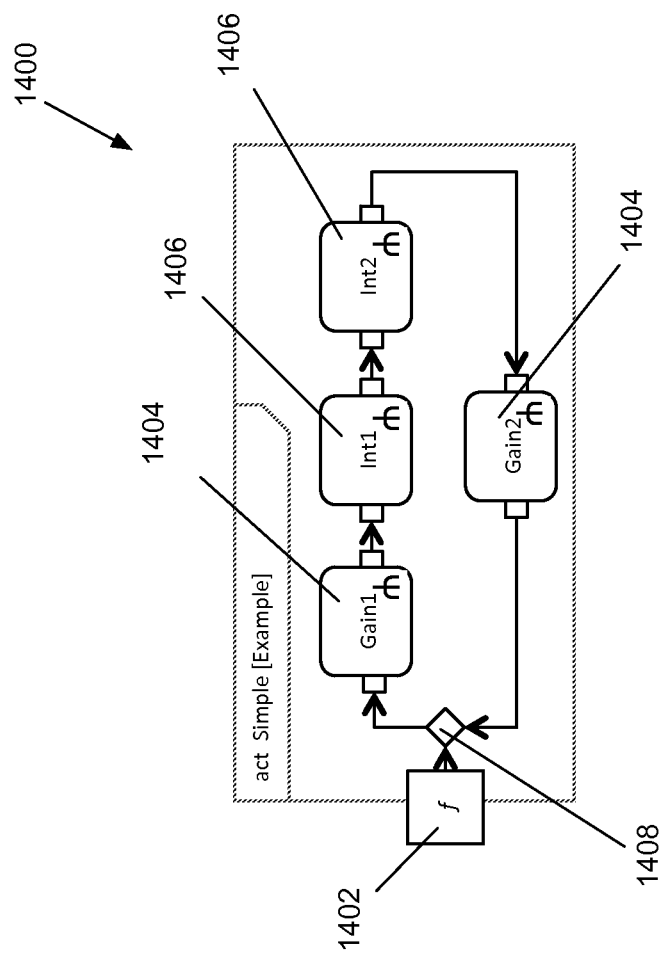
FIG. 14 depicts an example activity diagram that is equivalent to the system diagram of FIG. 13.

Key performance indices, such as fuel economy, can be written to a cell in a spreadsheet. The same numbers can be used to update the associated text strings in a block's value compartment, or a table in a linked requirement diagram. In some cases, a signal flow approach can be used to model a dynamic system. For example, FIG. 13 depicts an example system diagram 1300 that models a simple system. In the simple model depicted by the system diagram 1300, the spring displacement d is obtained by twice integrating the acceleration using integration blocks 1302. The acceleration is in turn obtained by using Newton's law $a=(f+kd)/m$, where k is the spring rate, f is the externally applied force, and m is the inertia. A summation block 1304 adds f and kd, while a multiplier block 1306 multiplies the sum (f+kd) by 1/m. The OMG SysML activity diagram is suitable for modeling a dynamic system using the signal flow approach because it shows how input is transformed into output with actions and activity blocks. An equivalent activity diagram 1400 for the simple system is shown in FIG. 14. The appearances are remarkably similar. The activity diagram 1400 includes an input node 1402, gain nodes 1404, integrator nodes 1406, and a summation node 1408. Although the graphical notations in act and ibd diagrams are different, the algorithm for creating a simulation model from an act diagram is similar to that for ibd. Mainly, the algorithm deals with recognizing the nodes attached to a connector and interpreting the text strings and icons, such as the rakes in the lower right corner of the nodes, in the diagram.

Figure 15:
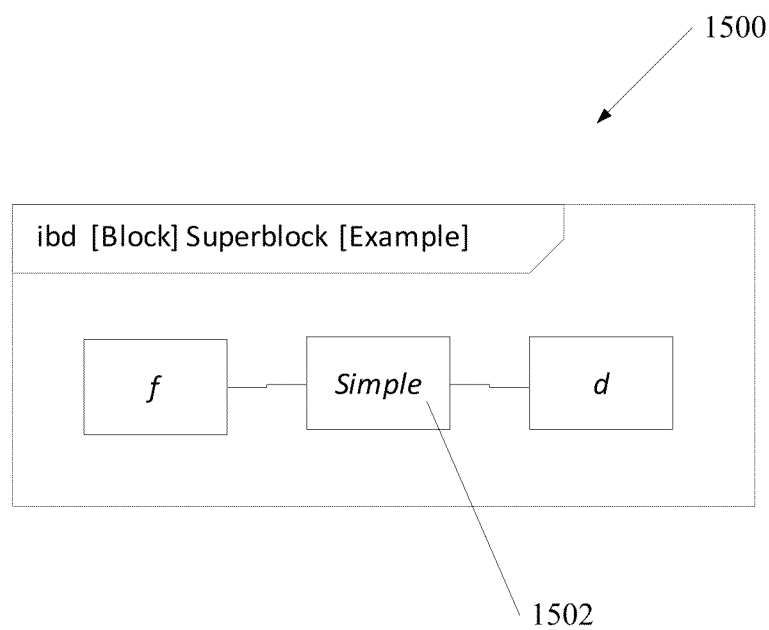
FIG. 15 depicts an example internal block diagram incorporating a superblock.

A block in an ibd or an act diagram may refer to a group of modeling elements, known as a superblock. FIG. 15 shows a simple spring-mass system 1500 as a superblock 1502 that is connected to an external force f and a block d to display the displacement. Connecting a superblock to other modeling elements can be done with the help of a dialog or with the dual-window method disclosed in U.S. patent application Ser. No. 12/967,360, filed Dec. 14, 2010, and U.S. patent application Ser. No. 12/972,042, filed Dec. 17, 2010. The disclosures of both applications are incorporated herein in their entirety.

In dynamic systems simulation, the solver may reside in the same computer as the spreadsheet environment, or in a remote location. The solver is indicated by the DSS block 304 of FIG. 3. The "cloud" with dashed line connecting the XLSE add-in 302 and the DSS block 304 indicates the solver may be a local client or in a remote server.

In addition, OMG SysML models can be used to launch other product evaluation and validation tools. For example, lumped parameter models are appropriate for characterizing the behavior of dynamics systems in which physical variables such as temperatures, velocity, voltage, etc., are idealized to be concentrated at certain points in space. Details such as shapes, elastic properties, and the like do not enter into the equations. For calculating stresses, magnetic field strengths, velocity distribution around bluff body, etc., high-order methods such as the finite-element or finite-volume methods may be used. Such methods require, among other data, detailed description of the geometry, and in most cases, a remote server to perform resource-intensive calculations. These requirements are beyond what a spreadsheet can provide; a spreadsheet cannot perform resource-intensive calculations and cannot easily be used to create 2D or 3D finite-element models. In those cases, the metadata for, and the results from launching a finite-element or finite-volume simulation can be stored in a block's compartment. Automation script that resides in a remote server can then be triggered by a macro in the spreadsheet environment to prepare the simulation data, launch the simulation, monitor the run, and fetch and report back the results when the run completes. Simulation results include key indices that can be used to update table entries in a linked requirement diagram. Simulation results also include details that are too large to store in a spreadsheet. Those results can be stored in a remote server and be accessed as needed with file path stored in the spreadsheet. Launching other performance simulation tools is indicated in FIG. 3 as the box 306 marked "Others." The tools can include, but are not limited to, finite-element and finite-volume meshers and solvers as cited earlier, as well as computer aided design (CAD) software used for drawing and detailing parts, electrical and electronic system design software, knowledge based engineering tools that are often integrated with CAD software, multibody dynamics solvers and antiquated Disk Operating System (DOS) applications that work with command line input and text files.

Figure 16:
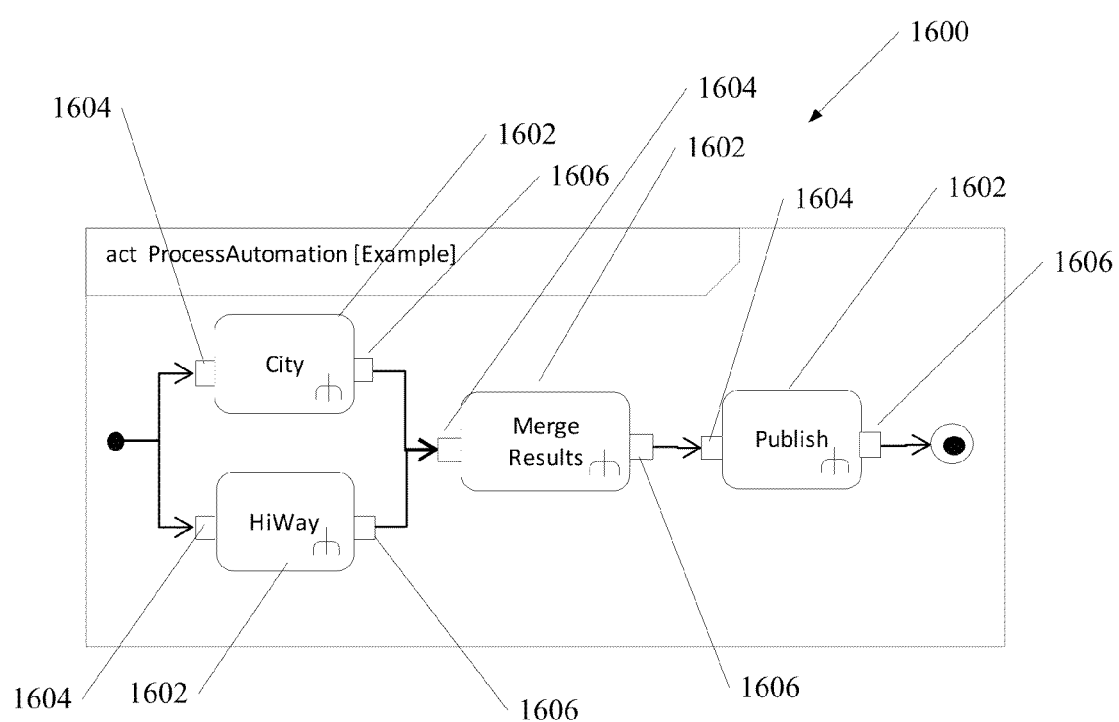
FIG. 16 depicts an example activity diagram used for process automation.

OMG SysML activity diagrams can be used for purposes other than modeling dynamic systems. For example, a number of related models can be run to produce an analysis report from data stored in external files or workbooks. FIG. 16 shows an example activity diagram 1600 that can be used for process automation. Implementing process automation in the EXCEL® spreadsheet environment consists of launching macros linked to the actions depicted in the diagram when conditions are met. The concepts of tokens and pins in OMG SysML may be used to control the order of launching the macros.

In the activity diagram 1600, actions are represented by rectangles 1602 with rounded corners. Tokens are items, such as information or variables, that are passed between actions through pins 1604 and 1606, which are the small rectangles attached to the outside of an action rectangle. Some pins 1604 are for input, while other pins 1606 are for output. A string may be appended to the name assigned by the spreadsheet environment to each pin to represent its state. For example, a "no" indicator, such as 0, signals that the token associated with the pin is not available or has not been received. A "yes" indicator, such as 1, signals the opposite.

Process automation can be implemented as a do loop where the action blocks in an activity diagram are continuously checked for their readiness to launch. For a given action rectangle, the state of all its pins is initially 0. When the macro associated with an action rectangle 1602 completes execution successfully, its output pins 1606 are set to 1, i.e., the pin names are updated. Likewise, the input pins 1604 of the downstream action rectangles 1602 receiving the token are also set to 1, indicating tokens have been received. The downstream action rectangle 1602 will launch its macro when all of its input pins 1604 have a state of 1. The do loop is terminated when the last of the downstream action rectangles 1602 completes execution.

OMG SysML also allows for control tokens to be passed between actions, and provides control nodes such as fork and join for routing the token flow. Those tokens and nodes can be handled using logical (if-then-else) constructs within the do loop.

An action in an activity diagram may require a human actor, e.g., to perform a test or run a finite-element simulation in the absence of automation scripts. In those cases, a work request system may be used as an intermediary to accept work order from the XLSE add-in when the user clicks a command button, and to dispatch the order for execution by the appropriate work team. Such a work request system can be as simple as a set of scripts written in an e-mail system, for example, the OUTLOOK® e-mail client available from Microsoft Corporation. Results can be reported back as attachments when the work is done. Scripts in the OUTLOOK® e-mail client have the advantage that they can programmatically update the cells, shapes, and other objects in a workbook in the EXCEL® spreadsheet environment. Process automation is indicated in FIG. 3 as the large rectangle with dashed line at reference numeral 326.

Figure 17:
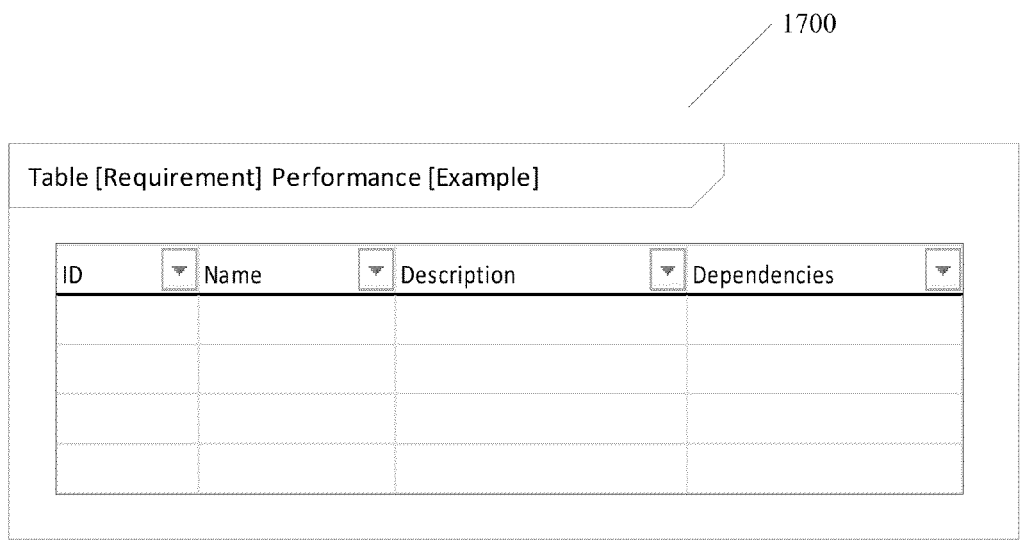
FIG. 17 is a diagram illustrating an example table for specifying systems requirements.

In some embodiments, systems requirements can be specified in OMG SysML in a graphical or tabular format. In a spreadsheet environment, the tabular format can be implemented by first inserting a table 1700 in a worksheet, and then inserting a diagram frame over the table, as shown in FIG. 17. Users will be able to leverage the capability of the EXCEL® spreadsheet environment to manipulate tabular data, such as pivot table, filter, row and column grouping, and in certain versions of the EXCEL® spreadsheet environment, slicers and sparklines. Moreover, cell values can be updated programatically as a result of doing a performance evaluation either as an isolated event, or as part of conducting a process automation.

OMG SysML provides various ways, called cross-cutting constructs, to show dependency between system components. For example, a dashed arrow with an appropriate keyword such as <<satisfy>> or <<copy>> can be used to indicate a relationship between two components. Alternatively, a keyword and name of component, such as satisfiedBy <<block>> xyz, may be in a block compartment to indicate the dependency. To programmatically update a requirement table, a macro can be written that parses the aforementioned cross-cutting constructs in a requirement diagram for test cases and related activities which in turn are mapped to launchable performance evaluation processes. The macro will also parse for cell locations and text ranges that need to be updated. Alternatively, where only a tabular format is used to depict the requirements, the macro can extract the required information from appropriate columns in the table.

During project review, it is often desirable to have a high-level, compact view of the development status, i.e. whether a system and its subsystems are red, yellow, or green. Moreover, for a subsystem that has development issues, it is often desirable to be able to drill down for root causes and relevant technical information. For example, one may want to know the maximum stresses in a part that has been identified as the "culprit." To enable requirement roll-up, where several performance indicators are compared to their target values and the deviations are combined to give an overall rating of red, yellow, or green, a macro can be written that uses the containment information in a requirement package diagram in combination with the constraint equations in a parametric diagram. The drill down also uses the same containment information, but uses the constraint equations in an inverse way.

As disclosed above, the XLSE add-in can be used to initiate and manage work using, e.g., a simple email system and to subsequently update the requirements table. In many cases, the user community may want to store the results in a database to provide, for example, better access control and scability. To support that requirement, the XLSE add-in may use an intermediary work management application that not only initiates and tracks work orders and reports back results, but also optimizes work schedules and resources. Since such an application typically uses a database to persist data, the XLSE add-in may programmatically pull information from the database to update activity status in a process automation loop and table entries in a requirement diagram. The update may be triggered by events, such as receipt of a work completion notification. The external databases that XLSE works with are collectively called work databases, shown as the work database 310 of FIG. 3. Database managers (DBMs) 314, 316, and 318 are used to manage and provide alternative views into the databases.

In addition to the work databases, the XLSE add-in may have to work with a product database 312, which is often tightly integrated with a CAD system 320 used for detailed design and parts release, as shown in FIG. 3. The XLSE add-in may also have to work with a variety of other databases (not shown in FIG. 3) that contain material properties, historical usage data, customer preferences, etc. The principle of using an intermediary application to initiate and manage work remains the same, but the information passed to the XLSE add-in is different. For example, subjective ratings and results from lumped parameter models may be used in a neural network model to optimize vehicle content and configuration.

The requirements database 308 of FIG. 3 may be used to manage requirements. Information may be pulled from those systems in a similar fashion as with the product database 312. In this regard, a database may be used to merge the external requirements with those contained in the XLSE add-in. Access to all databases may be made through ODBC connectivity of the spreadsheet environment. In this way, the database can be used as a model repository and can be synchronized with a workbook in the spreadsheet environment.

Some spreadsheet environments can take advantage of productivity suite interoperability, which provides a consistent set of object models to all applications in the productivity suite, to enable programmatic creation of other documents in the productivity suite from the shapes and other objects contained in a workbook. For example, comment blocks in various diagrams can be scanned and their contents extracted to populate an analysis report. As another example, one may prefer to view the state of requirements of a particular subsystem in a presentation format. The information may be compiled programmatically by copying the relevant diagrams and annotation to a Microsoft POWERPOINT® presentation software file or a Portable Document Format (PDF) file and subsequently displaying the file in a Web browser. In addition, developers can take advantage of Office/SharePoint integration in Microsoft's OFFICE® productivity suite to provide functionalities such as check-in/check-out and version control that are advantageous in a collaboration environment.

As demonstrated by the foregoing discussion, various embodiments may provide certain advantages, particularly in the context of modeling and simulating dynamic systems. For example, using a spreadsheet environment, such as Microsoft's EXCEL® spreadsheet environment, as a GUI for dynamic system simulation has a relatively quick learning curve and facilitates modeling and analyzing dynamic systems. The user can add instances of building blocks to the canvas and copy, cut, paste, connect, align, and distribute building blocks, all with familiar mouse and/or keyboard commands. Familiar commands can also be used to perform spell checking and other language-related functions, plot analysis results and create charts, write macros to automate modeling and simulation tasks, and access cell formulas.

It will be understood by those who practice the embodiments described herein and those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A method of modeling a system comprising a plurality of components, the method comprising:
using a computer to provide a spreadsheet environment comprising a plurality of workbooks, each workbook comprising a plurality of worksheets;
defining a plurality of shape objects within the spreadsheet environment, the shape objects representing the components of the system, each shape object having a component property comprising at least one of a spreadsheet environment-given name, a component type, a number of inputs and outputs, or parameters unique to the component type, wherein at least one component is a subsystem comprising a plurality of components, and wherein at least one shape object is a first superblock representing the subsystem, the components of the subsystem represented as a plurality of shape objects in a first worksheet of a workbook different from a second worksheet of the workbook in which other components of the system are represented, at least one shape object of the subsystem comprising a second superblock;
using a macro in the spreadsheet environment that provides user interface elements in the spreadsheet environment to manage the shape objects, relationships between the shape objects, and data associated with at least one of a dynamic system model, a business process model, or a workflow model in the spreadsheet environment, wherein at least one of the relationships between the shape objects comprises a connection between at least two shape objects defined using a graphic connector element having a property comprising respective identities of the at least two shape objects;
using the spreadsheet environment to interact with a federated system comprising a plurality of applications for working with the system;
using the spreadsheet environment in which the system model resides to model at least one of a dynamic system, a business process, or a workflow;
using the spreadsheet environment to generate a plurality of diagrams of the system or subsystem in a graphical system modeling language, the plurality of diagrams reflecting at least one of a requirements view, an activities view, a hierarchical view, a parametric view, a component and subsystem interaction view, a state transition view, or a cross allocation view;
in response to receiving a user input indicating activation of a diagram of the system or subsystem, executing an application of the federated system;
using the spreadsheet environment to diagram a plurality of system models and a plurality of subsystem models;
using a macro in the spreadsheet environment to perform at least one action on at least one of the system models or subsystem models to perform at least one of dynamic system simulation, process automation, and performance index calculations; and
using a simulation result to update a spreadsheet cell that is part of a tabular requirements diagram stored in the workbook.

2. The method of claim 1, wherein the at least one action is selected from conducting a simulation of the system model, simulating a dynamic system, automating a process, and calculating a performance index.

3. The method of claim 1, further comprising:
defining a range within the spreadsheet environment; and
using the range to store at least one of a table and a value in the graphical system modeling language.

4. The method of claim 1, further comprising:
storing the system model in a database; and
synchronizing the database with the workbook in the spreadsheet environment.

5. The method of claim 1, further comprising providing a tree control to navigate the components of the system.

6. The method of claim 1, further comprising:
associating a hyperlink with a first shape object representing a first component of the system; and in response to receiving a user selection of the hyperlink, invoking one of a product evaluation and validation tool and a worksheet corresponding to a second component of the system.

7. The method of claim 1, wherein the graphical system modeling language is OMG SysML.

8. A non-transitory computer readable storage medium storing instructions that, when executed by a computer, cause the computer to model a system comprising a plurality of components by:

using the computer to provide a spreadsheet environment comprising a plurality of workbooks, each workbook comprising a plurality of worksheets;

defining a plurality of shape objects within the spreadsheet environment, the shape objects representing the components of the system, each shape object having a component property comprising at least one of a spreadsheet environment-given name, a component type, a number of inputs and outputs, or parameters unique to the component type, wherein at least one component is a subsystem comprising a plurality of components, and wherein at least one shape object is a first superblock representing the subsystem, the components of the subsystem represented as a plurality of shape objects in a first worksheet of a workbook different from a second worksheet of the workbook in which other components of the system are represented, at least one shape object of the subsystem comprising a second superblock;

using a macro in the spreadsheet environment that provides user interface elements in the spreadsheet environment to manage the shape objects, relationships between the shape objects, and data associated with at least one of a dynamic system model, a business process model, or a workflow model in the spreadsheet environment, wherein at least one of the relationships between the shape objects comprises a connection between at least two shape objects defined using a graphic connector element having a property comprising respective identities of the at least two shape objects;

using the spreadsheet environment to generate a system model comprising a plurality of diagrams of the system or subsystem in a graphical system modeling language, the plurality of diagrams reflecting at least one of a requirements view, an activities view, a hierarchical view, a parametric view, a component and subsystem interaction view, a state transition view, or a cross allocation view;

using the spreadsheet environment in which the system model was generated to interact with a federated system comprising a plurality of applications for modeling a performance measure associated with the subsystem;

using the spreadsheet environment in which the system model was generated to model at least one of a dynamic system, a business process, or a workflow; and in response to receiving a user input indicating activation of a diagram of the system, using a macro to execute at least one of a dynamic system model, a business process model, or a workflow model in the spreadsheet environment in which the system model was generated or an application of the federated system.

9. The non-transitory computer readable storage medium of claim 8, wherein the at least one action is selected from conducting a simulation of the system model, simulating a dynamic system, automating a process, and calculating a performance index.

10. The non-transitory computer readable storage medium of claim 8, storing further instructions for:

defining a range within the spreadsheet environment; and
using the range to store at least one of a table and a value in the graphical system modeling language.

11. The non-transitory computer readable storage medium of claim 8, storing further instructions for:

storing the system model in a database; and
synchronizing the database with the workbook in the spreadsheet environment.

12. The non-transitory computer readable storage medium of claim 8, storing further instructions for providing a tree control to navigate the components of the system.

13. The non-transitory computer readable storage medium of claim 8, storing further instructions for:

associating a hyperlink with a first shape object representing a first component of the system; and
in response to receiving a user selection of the hyperlink, invoking one of a product evaluation and validation tool and a worksheet corresponding to a second component of the system.

14. The non-transitory computer readable storage medium of claim 8, wherein the graphical system modeling language is OMG SysML.

15. A computer system comprising:

a processor configured to receive and to execute processor-executable instructions;

a memory device in communication with the processor and storing processor-executable instructions that, when executed by the processor, cause the processor to model a system comprising a plurality of components by using the processor to provide a spreadsheet environment comprising a plurality of workbooks, each workbook comprising a plurality of worksheets;

defining a plurality of shape objects within the spreadsheet environment, the shape objects representing the components of the system, each shape object having a component property comprising at least one of a spreadsheet environment-given name, a component type, a number of inputs and outputs, or parameters unique to the component type, wherein at least one component is a subsystem comprising a plurality of components, and wherein at least one shape object is a first superblock representing the subsystem, the components of the subsystem represented as a plurality of shape objects in a first worksheet of a workbook different from a second worksheet of the workbook in which other components of the system are represented, at least one shape object of the subsystem comprising a second superblock;

using a macro in the spreadsheet environment that provides user interface elements in the spreadsheet environment to manage the shape objects, relationships between the shape objects, and data associated with at least one of a dynamic system model, a business process model, or a workflow model in the spreadsheet environment, wherein at least one of the relationships between the shape objects comprises a connection between at least two shape objects defined using a graphic connector element having a property comprising respective identities of the at least two shape objects;

using the spreadsheet environment to generate a system model comprising a plurality of diagrams of the system or subsystem in a graphical system modeling language, the plurality of diagrams reflecting at least one of a requirements view, an activities view, a hierarchical view, a parametric view, a component and subsystem interaction view, a state transition view, or a cross allocation view;

using the spreadsheet environment in which the system model was generated to interact with a federated system comprising a plurality of applications for determining a performance measure associated with the subsystem;

using the spreadsheet environment in which the system model was generated to model at least one of a dynamic system, a business process, or a workflow;

in response to receiving a user input indicating activation of a diagram of the system or subsystem, using a macro to execute at least one of a dynamic system model, a business process model, or a workflow model in the spreadsheet environment in which the system model was generated or an application of the federated system.

16. The computer system of claim 15, wherein the at least one action is selected from conducting a simulation of the system model, simulating a dynamic system, automating a process, and calculating a performance index.

17. The computer system of claim 15, wherein the memory device stores further instructions for:
defining a range within the spreadsheet environment; and
using the range to store at least one of a table and a value in the graphical system modeling language.

18. The computer system of claim 15, wherein the memory device stores further instructions for:
storing the system model in a database; and
synchronizing the database with the workbook in the spreadsheet environment.

19. The computer system of claim 15, wherein the memory device stores further instructions for providing a tree control to navigate the components of the system.

20. The computer system of claim 15, wherein the memory device stores further instructions for:
associating a hyperlink with a first shape object representing a first component of the system; and
in response to receiving a user selection of the hyperlink, invoking one of a product evaluation and validation tool and a worksheet corresponding to a second component of the system.

* * * * *